(12) United States Patent
Yamamoto et al.

(10) Patent No.: US 9,187,662 B2
(45) Date of Patent: Nov. 17, 2015

(54) INK, INK CARTRIDGE AND INK JET RECORDING METHOD

(71) Applicant: CANON KABUSHIKI KAISHA, Tokyo (JP)

(72) Inventors: Masashi Yamamoto, Yokohama (JP); Eiichi Nakata, Kawasaki (JP); Shuichi Okazaki, Fujisawa (JP); Satoshi Takebayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/232,650

(22) PCT Filed: Feb. 27, 2013

(86) PCT No.: PCT/JP2013/056048
§ 371 (c)(1),
(2) Date: Jan. 14, 2014

(87) PCT Pub. No.: WO2013/129687
PCT Pub. Date: Sep. 6, 2013

(65) Prior Publication Data
US 2014/0198151 A1    Jul. 17, 2014

(30) Foreign Application Priority Data

Mar. 2, 2012 (JP) ................................. 2012-046122

(51) Int. Cl.
*G01D 11/00* (2006.01)
*B41J 2/17* (2006.01)
*C09D 11/322* (2014.01)

(52) U.S. Cl.
CPC .................... *C09D 11/322* (2013.01)

(58) Field of Classification Search
CPC .............................. C09D 11/322; C09D 11/32
USPC ................ 347/100, 20, 95; 106/31.65, 31.13, 106/31.6, 31.27
See application file for complete search history.

(56) References Cited

U.S. PATENT DOCUMENTS

| | | | |
|---|---|---|---|
| 4,756,963 A | 7/1988 | Yamamoto et al. | |
| 4,780,348 A | 10/1988 | Yamamato et al. | |
| 5,082,496 A | 1/1992 | Yamamoto et al. | |
| 5,123,960 A | 6/1992 | Shirota et al. | |
| 5,127,946 A | 7/1992 | Eida et al. | |
| 5,130,723 A | 7/1992 | Yamamoto et al. | |
| 5,167,703 A | 12/1992 | Eida et al. | |
| 5,178,671 A | 1/1993 | Yamamoto et al. | |
| 5,213,614 A | 5/1993 | Eida et al. | |
| 5,215,577 A | 6/1993 | Eida et al. | |
| 5,215,578 A | 6/1993 | Eida et al. | |
| 5,258,505 A | 11/1993 | Eida et al. | |
| 5,415,686 A | 5/1995 | Kurabayashi et al. | |
| 5,451,251 A | 9/1995 | Mafune et al. | |
| 5,482,545 A | 1/1996 | Aoki et al. | |
| 5,571,313 A | 11/1996 | Mafune et al. | |
| 5,728,201 A | 3/1998 | Saito et al. | |
| 5,911,815 A | 6/1999 | Yamamoto et al. | |
| 6,003,987 A | 12/1999 | Yamamoto et al. | |
| 6,007,182 A | 12/1999 | Matsubara et al. | |
| 6,027,210 A | 2/2000 | Kurabayashi et al. | |
| 6,062,674 A | 5/2000 | Inui et al. | |
| 6,174,354 B1 | 1/2001 | Takizawa et al. | |
| 6,186,615 B1 | 2/2001 | Sato et al. | |
| 6,281,917 B1 | 8/2001 | Katsuragi et al. | |
| 7,615,113 B2 | 11/2009 | Aikawa et al. | |
| 7,705,071 B2 | 4/2010 | Nakagawa et al. | |
| 8,114,208 B2 | 2/2012 | Nakata et al. | |
| 8,602,546 B2 | 12/2013 | Shimizu et al. | |
| 8,602,547 B2 | 12/2013 | Nakata et al. | |
| 2009/0258145 A1 | 10/2009 | Mukae et al. | |
| 2010/0326321 A1 | 12/2010 | Enomura | |
| 2012/0147106 A1* | 6/2012 | Wakabayashi et al. | ....... 347/100 |

(Continued)

FOREIGN PATENT DOCUMENTS

| JP | 2001-164162 A | 6/2001 |
|---|---|---|
| JP | 2002-069323 A | 3/2002 |

(Continued)

OTHER PUBLICATIONS

International Search Report (PCT/ISA/210) dated Jun. 19, 2013, issued in PCT Application No. PCT/JP2013/056048, Notification of Transmittal of the International Search Report and the Written Opinion of the International Searching Authority, or the Declaration (PCT/ISA/220), and Written Opinion of the International Searching Authority (PCT/ISA/237).

(Continued)

*Primary Examiner* — Jannelle M Lebron
(74) *Attorney, Agent, or Firm* — Fitzpatrick, Cella, Harper & Scinto

(57) ABSTRACT

An ink containing water, a water-soluble organic solvent and an organic pigment, wherein a primary particle of the organic pigment has a ratio (minor axis b)/(major axis a) of 0.70 or more and a particle diameter of 35 nm or less, the ink contains a water-soluble organic solvent with a dielectric constant of 25.0 or less in an amount of 0.5% by mass or more based on the total mass of the ink, and a dielectric constant $\in_{mix}$ of the ink as calculated according to the following equation (1) is 66-72:

$$\in_{mix} = \Sigma_n \in_n r_n / \Sigma_n r_n \qquad \text{Equation (1):}$$

wherein n means a kind of water or the water-soluble organic solvent, $\in_n$ is a dielectric constant of water or the water-soluble organic solvent represented by n, and $r_n$ is a content of water or the water-soluble organic solvent represented by n based on the total mass of the ink.

15 Claims, No Drawings

(56) References Cited

U.S. PATENT DOCUMENTS

| | | |
|---|---|---|
| 2013/0063518 A1 | 3/2013 | Takebayashi et al. |
| 2013/0063533 A1 | 3/2013 | Yamamoto et al. |

FOREIGN PATENT DOCUMENTS

| | | |
|---|---|---|
| JP | 2002069323 A * | 3/2002 |
| JP | 2002-256166 A | 9/2002 |
| JP | 2002-256198 A | 9/2002 |
| JP | 2003-012968 A | 1/2003 |
| JP | 2007-191700 A | 8/2007 |
| JP | 2007-231074 A | 9/2007 |
| JP | 2008-019399 A | 1/2008 |
| JP | 2008-150558 A | 7/2008 |
| JP | 2009-263580 A | 11/2009 |
| JP | 2010-189661 A | 9/2010 |
| JP | 2011-213917 A | 10/2011 |
| JP | 2012-012505 A | 1/2012 |

OTHER PUBLICATIONS

Sep. 2, 2014 International Preliminary Report on Patentability in International Patent Appln. No. PCT/JP2013/056048.

* cited by examiner

INK, INK CARTRIDGE AND INK JET RECORDING METHOD

TECHNICAL FIELD

The present invention relates to an ink suitable for use in ink jet, and an ink cartridge and an ink jet recording method using the ink.

BACKGROUND ART

In recent years, there has been a strong demand for improving ozone resistance for an image recorded by an ink jet recording method. In order to meet such a demand, a pigment ink using a pigment as a coloring material is energetically considered. However, the pigment ink is low in color developability of an image recorded compared with a dye ink using a dye as a coloring material. In addition, an image recorded with the pigment ink is generally said to have excellent fastness properties compared with an image recorded with the dye ink. However, there is still a room for improvement in the ozone resistance of an image as represented by a phthalocyanine pigment. It is thus a problem to improve the color developability and ozone resistance of an image recorded with the pigment ink at the same time.

It is known to suppress scattered light of an image recorded by using an ink containing a pigment having a small particle diameter so as to improve the color developability of an image. For example, there has been proposed an ink containing a phthalocyanine pigment produced by a specific process and having a nano-order particle diameter (see PTL 1). On the other hand, in order to improve the ozone resistance of an image recorded, there has been proposed an ink containing a fine color particle with a pigment encapsulated with a film-forming resin (see PTL 2).

CITATION LIST

Patent Literature

PTL 1: Japanese Patent Application Laid-Open No. 2010-189661
PTL 2: Japanese Patent Application Laid-Open No. 2001-164162

SUMMARY OF INVENTION

Technical Problem

When the ink containing the phthalocyanine pigment described in PTL 1 is used, an image somewhat good in color developability can be recorded on so-called glossy paper. However, investigation by the present inventors has revealed that when the ink described in PTL 1 is used upon recording of an image on art paper, the color developability of the image is markedly lowered compared with a case where an ink containing a conventional coloring material is used. It has also been confirmed that when the ink described in PTL 1 is used, the ozone resistance of the image recorded may be lowered in some cases. In addition, the ink described in PTL 2 contains the resin in plenty, so that the smoothness of an image recorded is lowered, and moreover scattered light is increased. As a result, the color developability of the image is lowered, so that there is a problem that difficulty is encountered upon improvements in ozone resistance and color developability at the same time.

Accordingly, it is an object of the present invention to provide an ink capable of recording an image whose ozone resistance and color developability on various kinds of recording media are improved at a high level at the same time, and an ink cartridge and an ink jet recording method using such an ink.

Solution to Problem

The above object can be achieved by the present invention described below. That is, according to the present invention, there is provided an ink comprising water, a water-soluble organic solvent and an organic pigment, wherein a primary particle of the organic pigment has a ratio (minor axis b)/(major axis a) of 0.70 or more and a particle diameter of 35 nm or less, the ink contains a water-soluble organic solvent with a dielectric constant of 25.0 or less in an amount of 0.5% by mass or more based on the total mass of the ink, and a dielectric constant $\in_{mix}$ of the ink as calculated according to the following equation (1) is 66 or more and 72 or less:

$$\in_{mix} = \Sigma_n \in_n r_n / \Sigma_n r_n \qquad \text{Equation (1):}$$

wherein n means a kind of water or the water-soluble organic solvent, $\in_n$ is a dielectric constant of water or the water-soluble organic solvent represented by n, and $r_n$ is a content of water or the water-soluble organic solvent represented by n based on the total mass of the ink.

Advantageous Effects of Invention

According to the present invention, there can be provided an ink capable of recording an image whose ozone resistance and color developability on various kinds of recording media are improved at a high level at the same time, and an ink cartridge and an ink jet recording method using such an ink.

Further features of the present invention will become apparent from the following description of exemplary embodiments

DESCRIPTION OF EMBODIMENTS

The present invention will hereinafter be described in more detail by favorable embodiments. Incidentally, various physical property values such as a dielectric constant in the present description are all values at 25° C.

In order to improve the color developability of an image recorded with a pigment ink, it has heretofore been mainly conducted to use a pigment with the particle diameter of a secondary particle thereof reduced. Thus, the present inventors have also carried out various investigations including the use of such a pigment particle in an ink. As a result, it has been confirmed that it is more effective to reduce the particle diameter of a primary particle, not the particle diameter of the secondary particle, and the use of such an organic pigment brings about an effect to improve the color developability of an image recorded on glossy paper. However, it has been found that the ozone resistance of an image recorded is lowered with the reduction of the particle diameter of the pigment particle.

The present inventors have then verified the mechanism of the deterioration of a recorded image caused by being exposed to ozone. When a conventional ink containing an organic pigment is applied to a recording medium, a pigment layer in a state of containing voids is formed. Since an oxidizing gas such as ozone enters the interior of the pigment layer from the surface thereof through the voids, even a pigment particle located in the interior of the pigment layer comes to be exposed to ozone. It is thus considered that the ozone resistance of an image recorded is lowered. The present inventors have considered that if a pigment layer in a state of being tightly filled with a pigment particle may be formed, only a pigment particle located at the surface thereof is oxidized by ozone, and a pigment particle located in the interior thereof is not oxidized, and so higher ozone resistance than before can be achieved.

An organic pigment heretofore used as a coloring material of an ink has a large particle diameter and a relatively irregular shape. Therefore, it has been difficult to form a pigment layer in a state of being tightly filled with the pigment particle. It is also well known that when the particle diameter of a pigment particle is reduced, the ozone resistance of an image recorded is lowered.

On the other hand, the present inventors have found that when an organic pigment constituted by a near-spherical primary particle small in particle diameter is used as a coloring material of an ink, a pigment layer in a state of being tightly filled with the pigment particle can be formed, and consequently high ozone resistance is achieved. In the present invention, a value of a ratio (minor axis b)/(major axis a) of the primary particle is utilized as an index to indicate that the pigment particle is close to a sphere. The present inventors have found that use of an organic pigment constituted by a near-spherical primary particle having a particle diameter of 35 nm or less and a ratio (minor axis b)/(major axis a) of 0.70 or more can record an image improved in ozone resistance.

Incidentally, the organic pigment which is used in the ink according to the present invention and constituted by a near-spherical primary particle small in particle diameter is hard to form a structure. Accordingly, a pigment particle in a state of being dispersed in the ink is normally composed of one primary particle. Quite naturally, a pigment particle dispersed in such a state that plural primary particles have gathered is also present. However, such pigment particle is formed by at most several primary particles. This is greatly different from carbon black liable to form a structure by gathering of a great number of primary particles. Incidentally, in the present invention, not only when an organic pigment in a state of being dispersed in the ink is constituted by plural primary particles (that is, secondary particle), but also when it is constituted by one primary particle, it is described as "pigment particle" for the sake of convenience.

However, when the particle diameter of the primary particle is small, such a pigment particle tends to easily aggregate in the ink because the surface area of the pigment particle per unit mass becomes large. When the pigment particle aggregates in the ink, the particle diameter in a state of being dispersed becomes large, and moreover the shape of the aggregate of the pigment particle is irregular, so that it is difficult to form the pigment layer in the state of being tightly filled with the pigment particle. Under such circumstances, the present inventors have found that when the dielectric constant $\in_{mix}$ of an aqueous medium (a mixture of water and a water-soluble organic solvent) in the ink is controlled to 66 or more, the pigment particle is hard to aggregate in the ink and can be stably dispersed. Incidentally, the definition of the dielectric constant $\in_{mix}$ will be described in detail subsequently. When the dielectric constant is less than 66 on the other hand, plural pigment particles easily aggregate in the ink, and so it is difficult to form the pigment layer in the state of being tightly filled with the pigment particles, and the ozone resistance of the image cannot be improved.

The present inventors have carried out a further investigation. As a result, a problem that when using such a pigment particle that the particle diameter of the primary particle is small, the color developability of an image recorded on glossy paper is improved, while the color developability of an image recorded on art paper is lowered has been found. The art paper is one of recording media having a coating layer like glossy paper. However, the pore size of the coating layer thereof is large compared with glossy paper, so that the pigment particle is easy to penetrate into the coating layer. Thus, the art paper tends to lower the color developability compared with the glossy paper. The occurrence of this phenomenon is considered to be attributable to the fact that the pigment particle of which the particle diameter of the primary particle is small is easy to penetrate into the coating layer of the art paper compared with a conventional pigment particle. Thus, the present inventors have carried out an investigation under such an inference that the penetration of the pigment particle may be reduced by aggregating the pigment particle to some extent on the surface of a recording medium upon application of ink to the recording medium. As a result, it has been found that when the dielectric constant $\in_{mix}$ of the aqueous medium (the mixture of water and the water-soluble organic solvent) in the ink is controlled to 72 or less, and the (total) content of a water-soluble organic solvent with a dielectric constant of 25.0 or less is controlled to 0.5% by mass or more, the above problem can be solved. It is inferred that by satisfying these requirements, water which is a substance high in dielectric constant is evaporated in the course of the penetration of the ink into the recording medium, whereby the dielectric constant as the ink is rapidly lowered to promote the aggregation of the pigment particle. As a result, the aggregation is caused to proceed before the pigment particle is fixed to the recording medium, so that the pigment particle remains on the surface of the recording medium and in the neighborhood thereof to improve the color developability of the image even in the art paper.

If the dielectric constant $\in_{mix}$ is more than 72, or the content of the water-soluble organic solvent whose dielectric constant is 25.0 or less is less than 0.5% by mass, the promotion of aggregation of the pigment particle after the ink is applied to the recording medium becomes insufficient, so that the pigment particle penetrates into the coating layer of the art paper to lower the color developability of the image. Incidentally, if the water-soluble organic solvent whose dielectric constant is 25.0 or less is contained in excess, the dielectric constant $\in_{mix}$ is liable to be less than 66, and so the pigment particle is easy to aggregate in the ink as described above. As a result, there is a tendency for improvement in the ozone resistance of the image to become difficult.

When the above is summarized, the investigations by the present inventors have revealed that an ink satisfying the following requirements (i) to (iii) is provided, whereby such an effect that an image excellent in color developability and ozone resistance can be recorded is achieved.

(i) An organic pigment constituted by a primary particle, the ratio (minor axis b)/(major axis a) of which is 0.70 or more and a particle diameter of 35 nm or less is contained;
(ii) The dielectric constant $\in_{mix}$, calculated according to the equation (1) is 66 or more and 72 or less; and
(iii) A water-soluble organic solvent with a dielectric constant of 25.0 or less is contained in an amount of 0.5% by mass or more.

Ink:

The components constituting the ink according to the present invention will hereinafter be described in detail.

Organic Pigment

The ink according to the present invention contains an organic pigment (hereinafter also referred as "pigment particle" merely) constituted by a primary particle having a ratio (minor axis b)/(major axis a) of 0.70 or more and a particle diameter of 35 nm or less. The content (% by mass) of the pigment in the ink is favorably 0.1% by mass or more and 10.0% by mass or less, more favorably 0.1% by mass or more and 5.0% by mass or less based on the total mass of the ink. The ink may also contain two or more organic pigments constituted by the primary particle, the ratio (minor axis b)/(major axis a) of which is 0.70 or more and the particle diameter of which is 35 nm or less. In addition, a pigment different from the above organic pigment and/or a dye may also be used in combination as a coloring material of the ink. When another coloring material is used in addition to the organic pigment constituted by the primary particle having a ratio (minor axis b)/(major axis a) of 0.70 or more and a particle diameter of 35 nm or less, the proportion of the organic pigment of all the coloring materials in the ink is favorably 30.0% by mass or more.

It is only necessary to select the kind of the organic pigment in such a manner that the hue of the ink becomes a desired hue. Examples of the organic pigment include a phthalocyanine pigment, a quinacridone pigment, an azo pigment, an isoindolinone pigment, a benzimidazolone pigment, a diketopyrrolopyrrole pigment, a dioxazine pigment, an anthraquinone pigment, a perylene pigment, a xanthene pigment, an azomethine pigment and a quinophthalone pigment. Among these, the phthalocyanine pigment, quinacridone pigment and azo pigment are favorable, and the phthalocyanine pigment is particularly favorable.

From the viewpoint of a dispersion method of the pigment, a resin-dispersed pigment using a resin as a dispersant and a self-dispersible pigment into the particle surface of which a hydrophilic group has been introduced may be used. In addition, a resin-bonded type self-dispersible pigment to the particle surface of which an organic group containing a polymer has been chemically bonded and a microcapsule pigment in which at least a part of the particle surface has been coated with a resin may also be used. In particular, a self-dispersible pigment in which a hydrophilic group has been bonded to the particle surface thereof directly or through another atomic group is favorable. The reason for it is that since the hydrophilic group has a polarity, aggregation of the pigment particle in the ink is more effectively inhibited than a case where the pigment particle is dispersed by a dispersant, and so the particle diameter of the pigment particle can be retained to a small size, and the shape of the pigment particle can be kept closer to a sphere. Examples of the hydrophilic group include nonionic groups and ionic groups. Ionic groups are favorable, and anionic groups are more favorable.

Examples of the hydrophilic group bonded directly or through another atomic group to the surface of the pigment particle in the self-dispersible pigment include nonionic groups such as —OH, and anionic groups such as —COOM, —SO$_3$M, —PO$_3$HM and —PO$_3$M$_2$. M in the formulae is a hydrogen atom, alkali metal, ammonium or organic ammonium. As examples of said another atomic group (—R—), linear or branched alkylene groups having 1 to 12 carbon atoms, arylene groups such as a phenylene and naphthylene groups, an amide group, a sulfonyl group, an amino group, a carbonyl group, an ester group and an ether group may be mentioned.

Groups with these groups combined may also be mentioned. As specific examples of the alkali metal represented by M in the above formulae, lithium, sodium and potassium may be mentioned. When the hydrophilic group forms a salt, the salt in the ink may be in any state of a partially dissociated state and a wholly dissociated state.

A self-dispersible pigment in which a hydrophilic group has been bonded to the particle surface thereof by an oxidation treatment may also be used. As examples of such a self-dispersible pigment, those obtained by conducting an oxidation treatment with sodium hypochlorite, an underwater ozone treatment and an ozone treatment, and then conducting wet oxidation with an oxidizing agent to modify the surface of a pigment particle may be mentioned.

In the present invention, a pigment dispersion liquid or an ink is suitably diluted with pure water, and a pigment particle in the dispersion liquid or the ink is then photographed through a transmission electron microscope (TEM) or a scanning electron microscope (SEM) to regard the longest diameter extending through the center of gravity of a minimum-unit particle constituting the pigment particle as a particle diameter of a primary particle thereof. An average value of particle diameters of 30 primary particles is regarded as a particle diameter of the primary particle thereof. The primary particle is required to have a particle diameter of 35 nm or less, and the particle diameter is favorably 25 nm or less. The lower limit of the particle diameter of the primary particle is 5 nm or more. Incidentally, in order to prescribe that the organic pigment is an organic pigment whose primary particle is small, the particle diameter of the primary particle is defined as the longest diameter in the present invention. As the prescription of the primary particle diameter of a pigment, an average value of the longest diameter and the shortest diameter has heretofore been often used. However, the primary particle of the organic pigment used in the present invention may be said to be generally smaller than a conventional small-sized organic pigment defined by the average value of the longest diameter and the shortest diameter if both organic pigments have the same primary particle diameter.

In the present invention, it is also important that the primary particle is near spherical. A sphericity measuring method commonly used in such a field as toners is difficult to be applied to such a pigment small in particle diameter as used in the present invention. Accordingly, in the present invention, a ratio (minor axis b)/(major axis a) of a primary particle is used as an index indicating that the primary particle is substantially spherical. In order to determine the ratio (minor axis b)/(major axis a) of the primary particle, the major axis a and the minor axis b of the primary particle are first measured in the same manner as in the above-described measurement of the particle diameter of the primary particle. Specifically, a pigment dispersion liquid or an ink is suitably diluted with pure water, and a pigment particle in the dispersion liquid or the ink is then photographed through a transmission electron microscope (TEM) of a scanning electron microscope (SEM). The longest diameter and the shortest diameter extending through the center of gravity of a minimum-unit particle constituting the pigment particle are regarded as a major axis a and a minor axis b, respectively. A ratio (minor axis b)/(major axis a) is calculated from the major axis a and the minor axis b measured in this manner. An average value of ratios of minor axis b/major axis a of 30 primary particles is regarded as a ratio (minor axis b)/(major axis a) of the primary particle thereof. The ratio (minor axis b)/(major axis a) of the primary particle is required to be 0.70 or more and is favorably 0.80 or more. The ratio (minor axis b)/(major axis a) is theoretically 1.0 or less. Incidentally, the particle diameter and ratio (minor axis b)/(major axis a) of the primary particle in the present invention as measured in the above-described manner are values measured on the pigment particle itself exclusive of a resin and the like. When the pigment particle in a state of being dispersed in the ink is of one primary particle, such particle becomes a primary particle.

As described above, the organic pigment used in the ink according to the present invention may be dispersed in a state of being plural primary particles have gathered in the ink (a secondary particle has been formed). However, the organic pigment is often dispersed as one primary particle. In addition, even when the organic pigment forms secondary particles, most of the secondary particles are formed by at most several primary particles, specifically two or three primary particles. Accordingly, in the ink according to the present invention, the average particle diameter of the pigment particle present in the ink is considerably small compared with a conventional ink containing an organic pigment. In the present invention, a 50% cumulative particle diameter $D_{50}$ (nm) in a particle diameter distribution of the pigment particle is favorably 70 nm or less for the pigment particle present in the ink. The lower limit of $D_{50}$ is favorably 30 nm or more. $D_{50}$ can be measured by means of, for example, a particle diameter distribution measuring apparatus of a dynamic light scattering system.

The organic pigment used in the ink according to the present invention can be obtained according to a general-purpose preparation process of a pigment particle existing heretofore. The preparation process of the pigment particle is roughly divided into two processes of a breakdown process and a build-up process. The breakdown process is a process in which a mixture of a bulk material or a raw material compound, a dispersant and a solvent is mechanically ground by means of a dispersing device such as Beads Mill to obtain a pigment particle. The build-up process is a process in which a pigment particle is obtained through such a process as a chemical reaction and deposition from a raw material compound dissolved in a solvent.

As examples of the dispersing device commonly used in the breakdown process, a media-type dispersing machine, an ultrasonic dispersing machine and a high-pressure collision type dispersing machine may be mentioned. In addition, prior to the use of the dispersing device, it is also favorable to preliminarily subject the mixture to a pretreatment using, for example, a rotation shearing-type stirring machine for preventing clogging in a nozzle or a path of the dispersing device.

As examples of the media-type dispersing machine, those in which a disc, pin or ring is provided on a stirring shaft and those in which a rotor rotates may be mentioned. Incidentally, the disc provided on the stirring shaft may be either a perforated disc or a disc with a notch or groove formed therein. As specific examples of such a media-type dispersing machine, conventionally known devices such as sand mill, dyno mill and beads mill may be mentioned.

As the ultrasonic dispersing machine, conventionally known machines such as "US-300T" and "US-1200TCVP" (both, manufactured by Nippon Seiki), and "Digital Sonifier 250D" (manufactured by BRANSON), as designated by trade names, may be used.

As the high-pressure collision type dispersing machine, for example, a dispersing machine provided with a chamber in which the mixture is pressurized by a high-pressure plunger pump to eject it from a small-diameter nozzle may be used. Specifically, a media-less dispersing machine such as a homogenizer is favorable. A pressurization pressure upon use of the high-pressure collision type dispersing machine is favorably 100 MPa or more. The number of times of the treatment by the high-pressure collision type dispersing machine is favorably two or more.

The rotation shearing-type stirring machine used in the pretreatment may be a stirring machine capable of applying shearing force to the raw material in the mixture, and a conventionally known batch type stirring machine may be used.

The term "shearing force" used herein includes mechanical energy capable of dispersing powder or fine particle, such as impact force or cavitation, in addition to shear stress. It is favorable to apply shearing force as high as possible to the raw material. Specifically, the shear rate is favorably set to $10^4$/sec or more, more favorably $10^5$/sec or more. Such high shearing force may be applied by using a stirring machine provided with a rotor and a stator, in which a gap between the rotor and the stator is set small, and high-speed rotation becomes feasible. As specific examples of such a stirring machine, batch type stirring machines such as "ULRRA-TURRAX" (manufactured by IKA), "T.K. HOMO MIXER" and "T.K. FILMICS (both, manufactured by Primix), and "CLEARMIX" (manufactured by M Technique), as designated by trade names, may be mentioned.

On the other hand, as examples of a dispersing device commonly used in the build-up process, a micro-channel type liquid treating device (microreactor) used in, for example, a microchemical process may be mentioned. As specific examples of the microreactor, "MICROMIXER" and "MICROREACTOR" (both, manufactured by IMM), "MICROREACTOR" (manufactured by CPC Technology), and "ULREA SS-11" (manufactured by M Technique), as designated by trade names, may be mentioned.

When the pigment particle constituted by the primary particle having a ratio (minor axis b)/(major axis a) of 0.70 or more and a particle diameter of 35 nm or less is prepared, it is considered that some change is favorably caused in crystal structure of a pigment which becomes a raw material. Here, the crystal structure of the pigment can be changed by the breakdown process. However, when a pigment particle is prepared by the breakdown process, the surface of a pigment particle produced by grinding is liable to have activity, so that plural pigment particles tend to cause aggregation using the active surface as a nucleus and to make a coarse particle. Thus, a liquid containing the pigment particle (pigment dispersion liquid or ink) tends to cause change with time, such as thickening. In addition, it may be difficult in some cases to control the shape of the pigment particle in particular. Therefore, when the pigment particle used in the present invention is prepared, it is more favorable to utilize the build-up process rather than the breakdown process.

When the pigment particle constituted by the primary particle having a ratio (minor axis b)/(major axis a) of 0.70 or more and a particle diameter of 35 nm or less is prepared by the build-up process, the following procedure is favorably taken. First, a pigment particle is deposited as a fine particle from a liquid with a raw material (crude pigment) dissolved therein by means of, for example, the above-described microreactor to prepare a wet cake containing the pigment particle. Thereafter, a post-treatment (dispersion of the pigment particle) is favorably conducted in the presence of a resin dispersant as needed. In this post-treatment, a device generally used upon the preparation of an ink jet ink, for example, the above-described media-type dispersing machine, ultrasonic dispersing machine, high-pressure collision type dispersing machine or rotation shearing-type stirring machine may be used. However, the post-treatment is favorably conducted in such a manner that no change in the shape of the pigment particle is caused by the dispersion treatment. Therefore, conditions upon the dispersion, such as dispersion time, peripheral speed, and kind and particle diameter of the media used as needed, are made gentle compared with dispersion conditions when the pigment particle used in the present invention is obtained by the breakdown process. In addition, it is also favorable that the mixture containing the raw material (crude pigment) and the dispersant used as needed is treated by the microreactor to obtain a pigment dispersion liquid containing the pigment particle at a low concentration, the resultant pigment dispersion liquid is then concentrated by a treatment such as ultrafiltration, and besides impurities are removed.

An investigation by the present inventors has revealed that a pigment particle obtained by the following process is used, whereby the ozone resistance of an image recorded may be more improved. That is, the pigment particle used in the ink according to the present invention is favorably that obtained by feeding a liquid with a raw material (crude pigment) dissolved therein to a flow path formed by arranging 2 treating surfaces that relatively rotate facing each other at an interval of 1 mm or less, and depositing a pigment particle as a fine particle in the flow path. As examples of a microreactor capable of embodying such a process, may be mentioned "ULREA SS-11" (trade name, manufactured by M Technique).

The present inventors presume the reason why the ozone resistance of the image recorded with the ink containing the pigment particle obtained by the above-described process is more improved to be as follows. The device such as "ULREA SS-11" is a microreactor of a so-called forced thin film type, and a velocity gradient is produced in a fluid flowing in the flow path by relative rotation of the two discs (treating surfaces) approachably and separably arranged. Therefore, a pigment particle with a very high sphericity compared with another process can be produced. When such a pigment particle with a high sphericity is used, the pigment particle is fixed in a tighter state to a recording medium. It is considered that the ozone resistance of an image recorded can be thereby improved.

Aqueous Medium:

The ink according to the present invention contains an aqueous medium constituted by water and a water-soluble organic solvent. The ink is required to have a dielectric constant $\in_{mix}$ of 66 or more and 72 or less as calculated according to the following equation (1):

$$\in_{mix} = \Sigma_n \in_n r_n / \Sigma_n r_n \quad \text{Equation (1):}$$

wherein n means the kind of water or the water-soluble organic solvent, $\in_n$ is a dielectric constant of water or the water-soluble organic solvent represented by n, and $r_n$ is a content of water or the water-soluble organic solvent represented by n based on the total mass of the ink.

The dielectric constant $\in_{mix}$ defined by the equation (1) indicates a dielectric constant as a whole of "the aqueous medium constituted by water and the water-soluble organic solvent" in the ink and may be specifically calculated in the following manner. That is, the dielectric constant is a value obtained by multiplying a dielectric constant (dimensionless number) particular to water or the water-soluble organic solvent by a content of such component in the ink (content based on the total mass of the ink, unit: % by mass), summing up the thus-obtained product for the respective components, and dividing the sum total thereof by the total content of water and the water-soluble organic solvent. Incidentally, the dielectric constant can be measured by a general dielectric constant meter. In addition, the content of water in the ink can be known by, for example, the Karl Fischer titration, and the kind and content of the water-soluble organic solvent can be known by, for example, gas chromatography (GC/MS) or high-performance liquid chromatography (LC/MS).

In general, "water-soluble organic solvent" means a liquid. In the present invention, however, a solvent that is solid at 25° C. (ordinary temperature) is also included in the water-soluble organic solvent. As examples of a water-soluble organic solvent that is commonly used in an aqueous ink and solid at 25° C., 1,6-hexanediol, trimethylolpropane, ethyleneurea, urea and polyethylene glycol having a number average molecular weight of 1,000 may be mentioned. The dielectric constant of the water-soluble organic solvent that is solid at 25° C. is defined as a value determined according to the equation (1) from the dielectric constant (measured value) of a 50% (by mass) aqueous solution thereof and the dielectric constant of water. For example, supposing that dielectric constants of a water-soluble organic solvent A that is solid at 25° C. and water are $\in_a$ and $\in_w$, respectively, and the dielectric constant of a 50% aqueous solution of the water-soluble organic solvent A is $\in_{mix}$, $\in_a$ is determined by using the measured value of $\in_{mix}$ in the following manner.

$$\in_a = (\in_{mix} \times 100[\%] - \in_w \times 50[\%])/50[\%].$$

Here, the reason why the dielectric constant of the water-soluble organic solvent that is solid at 25° C. is determined from the dielectric constant of the 50% aqueous solution is as follows. Those capable of becoming a component of an aqueous ink in water-soluble organic solvents that are solid at 25° C. include solvents that are difficult to prepare an aqueous solution of such a high concentration as to more than 50%. On the other hand, in an aqueous solution of such a low concentration as to be 10% or less, the dielectric constant of water becomes dominant, and so a true (effective) dielectric constant value of such water-soluble organic solvent cannot be obtained. Thus, the present inventors have carried out an investigation. As a result, it has been found that most of those used in an ink in the water-soluble organic solvents that are solid at 25° C. permit preparing an aqueous solution that is an object of the measurement, and a dielectric constant determined also conforms to the effect of the present invention. Such a reason has resulted in the use of the 50% aqueous solution. Incidentally, regarding a water-soluble organic solvent that is solid at 25° C. and difficult to prepare the 50% aqueous solution because its low solubility in water, its aqueous solution of a saturated concentration is used, and the dielectric constant value calculated according to the above-mentioned case of determining $\in_a$ is conveniently used.

No particular limitation is imposed on the kind of the water-soluble organic solvent so far as the dielectric constant $\in_{mix}$ calculated by the equation (1) can be adjusted to 66 or more and 72 or less. In addition, plural kinds of water-soluble organic solvents may also be used in combination. The (total) content (% by mass) of the water-soluble organic solvent in the ink is favorably 3.0% by mass or more and 50.0% by mass or less, more favorably 8.0% by mass or more and 30.0% by mass or less based on the total mass of the ink. Incidentally, this content of the water-soluble organic solvent is a value including a water-soluble organic solvent whose dielectric constant is 25.0 or less and which will be described subsequently, and a including 1,2-alkanediol if used. The dielectric constant of water is 78.5, and deionized water (ion-exchanged water) is favorably used in the ink. The content (% by mass) of water in the ink is favorably 50.0% by mass or more and 95.0% by mass or less, more favorably 70.0% by mass or more and 90.0% by mass or less based on the total mass of the ink.

Specific examples of the water-soluble organic solvent include those shown below (a numeral value in a parenthesis is a dielectric constant). Monohydric alcohols having 1 to 4 carbon atoms, such as methyl alcohol, ethyl alcohol, n-propyl alcohol, isopropyl alcohol (18.3), n-butyl alcohol, sec-butyl alcohol and tert-butyl alcohol; dihydric alcohols such as 1,2-propanediol (28.8), 1,3-butanediol, 1,5-pentanediol (27.0), 1,2-hexanediol (14.8), 1,6-hexanediol (7.1), 2-methyl-1,3- propanediol and 3-methyl-1,5-pentanediol (23.9); polyhydric alcohols such as 1,2,6-hexanetriol (28.5), glycerol (42.3), trimethylol-propane (33.7) and trimethylolethane; alkylene glycols such as ethylene glycol (40.4), diethylene glycol (31.7), triethylene glycol (22.7), tetraethylene glycol, propylene glycol (16.9), butylene glycol, hexylene glycol and thiodiglycol; glycol ethers such as diethylene glycol monomethyl, diethylene glycol monoethyl ether, triethylene glycol monoethyl ether and triethylene glycol monobutyl ether (9.8); polyalkylene glycols having a number average molecular weight of 200 to 1,000, such as polyethylene glycol having a number average molecular weight of 1,000 (4.6) and polypropylene glycol; nitrogen-containing compounds such as 2-pyrrolidone (28.0), N-methyl-2-pyrrolidone, 1,3-dimethyl-2-imidazolidinone, N-methylmorpholine, urea (110.3) and ethyleneurea (49.7); and sulfur-containing compounds such as dimethyl sulfoxide and bis(2-hydroxyethyl sulfone). Incidentally, as the water-soluble organic solvent contained in the ink, that having a dielectric constant of 3.0 or more is favorably used.

Water-Soluble Organic Solvent Whose Dielectric Constant is 25.0 or Less:

The ink according to the present invention contains a water-soluble organic solvent whose dielectric constant is 25.0 or less. The content (% by mass) of the water-soluble organic solvent whose dielectric constant is 25.0 or less is required to be 0.5% by mass or more based on the total mass of the ink. That is, when the water-soluble organic solvent whose dielectric constant is 25.0 or less is only one, the content thereof is required to be 0.5% by mass or more. When two or more such organic solvents are contained, the total content thereof is required to be 0.5% by mass or more. In addition, the content (% by mass) of the water-soluble organic solvent whose dielectric constant is 25.0 or less in the ink is favorably 2.0% by mass or more and 15.0% by mass or less, more favorably 2.0% by mass or more and 10.0% by mass or less based on the total mass of the ink. Specific examples of the water-soluble organic solvent whose dielectric constant is 25.0 or less include (with the dielectric constant thereof shown in a parenthesis) 3-methyl-1,5-pentanediol (23.9), triethylene glycol (22.7), propylene glycol (16.9), 1,2-hexanediol (14.8), triethylene glycol monobutyl ether (9.8), 1,6-hexanediol (7.1) and polyethylene glycol (4.6) having a number average molecular weight of 1,000. These water-soluble organic solvents whose dielectric constants are 25.0 or less may be used either singly or in any combination thereof.

In the present invention, the content of water, and the kind(s) and content(s) of the water-soluble organic solvent(s) can be determined so as to satisfy the following conditions in view of various image characteristics and reliability of the ink under the premise that the above-described range of the dielectric constant $\in_{mix}$ is satisfied. First, a water-soluble organic solvent whose dielectric constant is more than 25.0 may also be contained in the ink in addition to the water-soluble organic solvent whose dielectric constant is 25.0 or less. In addition, two or more water-soluble organic solvents whose dielectric constants are 25.0 or less may be contained in the ink, and two or more, favorably three or more water-soluble organic solvents whose dielectric constants is more than 25.0 may be contained.

From the viewpoint that ejection properties in the case where the ink according to the present invention is used as an ink jet ink are improved, in addition to the above-described effect that the color developability and ozone resistance can be improved, plural kinds of water-soluble organic solvents are favorably contained in the ink. In addition, three or more water-soluble organic solvents are more favorably contained in the ink. Further, the water-soluble organic solvent whose dielectric constant is 25.0 or less and the water-soluble organic solvent whose dielectric constant is more than 25.0 are favorably used in combination, and two or more of the respective water-soluble organic solvents whose dielectric constants are 25.0 or less and more than 25.0 are more favorably used.

1,2-Alkanediol:

In the present invention, a 1,2-alkanediol is favorably included in the water-soluble organic solvent whose dielectric constant is 25.0 or less. The 1,2-alkanediol is used, whereby color developability of an image recorded on art paper can be greatly improved. The reason why the color developability of the image recorded on the art paper can be greatly improved by using the 1,2-alkanediol is presumed to be as follows. The 1,2-alkanediol is a compound having a structure similar to a so-called surfactant in which a main chain of a molecular structure thereof is constituted by a hydrophobic alkyl chain and one terminal thereof has two hydrophilic hydroxy groups. The 1,2-alkanediol has a low molecular weight compared with a general surfactant. Therefore, it is considered that the 1,2-alkanediol can enter a small interstice between adjoining pigment particles, and the hydrophobic portion thereof is adsorbed on the surface of the pigment particle. It is thereby considered that the penetration rate of the 1,2-alkanediol into a recording medium is thereby slow compared with any other water-soluble organic solvent, and so a higher aggregation promoting effect can be exhibited. Such an effect is particularly effectively exhibited in the organic pigment used in the present invention compared with a general pigment. The reason for this is that since the organic pigment used in the present invention is such that the particle diameter of a primary particle thereof is small, its surface area (specific surface area) per unit mass is considerably large compared with another general pigment, and so the 1,2-alkanediol is easier to be adsorbed on the surface of the pigment particle.

Specific examples of a 1,2-alkanediol whose dielectric constant is 25.0 or less include 1,2-hexanediol (dielectric constant: 14.8), 1,2-heptanediol, 1,2-octanediol and 1,2-nonanediol. The number of carbon atoms of an alkyl group in the 1,2-alkanediol is favorably 5 to 8, more favorably 6 to 8. If the number of carbon atoms of the alkyl group is less than 5, the dielectric constant of such a 1,2-alkanediol becomes high, so that the aggregation promoting effect thereof may not be sufficiently achieved in some cases. If the number of carbon atoms of the alkyl group is more than 8 on the other hand, such a 1,2-alkanediol is hard to be dissolved in water. Therefore, some co-solvent has to be used in some cases for dissolving the 1,2-alkanediol in the ink. The content (% by mass) of the 1,2-alkanediol whose dielectric constant is 25.0 or less in the ink is favorably 0.2% by mass or more and 10.0% by mass or less based on the total mass of the ink. If the content of the 1,2-alkanediol is less than 0.2% by mass, the effect to prevent the penetration of the pigment particle into the coating layer of the art paper may not be sufficiently achieved in some cases. If the content of the 1,2-alkanediol is more than 10.0% by mass on the other hand, ejection properties of the resulting ink from a recording head may be liable to be lowered in some cases. As a result, there is a tendency to achieve no sufficient color developability.

Incidentally, when a 1,2-alkanediol whose dielectric constant is 25.0 or less is used, the content thereof in the ink is favorably 0.2% by mass or more and 10.0% by mass or less as described above. However, when only the 1,2-alkanediol is used as the water-soluble organic solvent whose dielectric constant is 25.0 or less, the content thereof has to be controlled to 0.5% by mass or more. On the other hand, when another water-soluble organic solvent whose dielectric constant is 25.0 or less is used in addition to the 1,2-alkanediol whose dielectric constant is 25.0 or less, it is only necessary to control the total content thereof to 0.5% by mass or more. Accordingly, in this case, the content of the 1,2-alkanediol may be 0.2% by mass or more and less than 0.5% by mass.

Other Components:

The ink according to the present invention may contain various additives as needed. As examples of such additives, a surfactant, a pH adjustor, an antifoaming agent, a rust preventive, a preservative, a mildewproofing agent, an antioxidant, an anti-reducing agent, an evaporation accelerator and a chelating agent may be mentioned. Incidentally, the contents of these additives in the ink are generally considerably low, and its influence "directly" exerted on the aggregation timing of the pigment particle is also low. Therefore, in the present invention, these additives are not included in "the water-soluble organic solvent" not to be the object of the calculation of the dielectric constant.

A polyoxyethylene alkyl ether is favorably caused to be contained as a surfactant in the ink according to the present invention. The ozone resistance and color developability of an image recorded can be thereby further improved. The present inventors consider the reason why the polyoxyethylene alkyl ether is particularly favorable for achieving such an effect to be as follows.

Since the polyoxyethylene alkyl ether is a nonionic surfactant having a polyoxyethylene chain and an alkyl chain in its molecular structure, it is compatible with both hydrophilic substance and lipophilic substance. Accordingly, the polyoxyethylene alkyl ether has an effect to stably retain a dispersed state of the pigment particle in the ink. Therefore, when the polyoxyethylene alkyl ether is contained in the ink, the aggregation of the pigment particles can be effectively inhibited, and the shape of the pigment particle can be kept nearer to a sphere. In addition, the polyoxyethylene alkyl ether is a compound having a somewhat high molecular weight. Therefore, the evaporation rate and penetration rate of the polyoxyethylene alkyl ether from and into a recording medium are gentle. In addition to this, the compatible nature to both hydrophilic substance and lipophilic substance of the polyoxyethylene alkyl ether is also synergistically affected, whereby the penetration rate of the ink itself into the recording medium can be lowered. Thus, the pigment particle in a liquid ink droplet applied to the recording medium can rapidly aggregate to form a tight pigment layer with a small amount of voids. As a result, the ozone resistance of an image recorded can be more improved.

The polyoxyethylene alkyl ether has a structure represented by a general formula R—O—$(CH_2CH_2O)_m$H. R in the general formula is a hydrocarbon group, and m is an integer. In the polyoxyethylene alkyl ether contained in the ink according to the present invention, the number of carbon atoms of R (alkyl group) in the general formula which is a hydrophobic group thereof is favorably 12 to 22. More specifically, R in the general formula is favorably a lauryl group (12), a cetyl group (16), a stearyl group (18), an oleyl group (18) or a behenyl group (22) (a numeral value in a parenthesis is the number of carbon atoms in the hydrocarbon group). In addition, m in the general formula that designates the number of the hydrophilic groups in the polyoxyethylene alkyl ether is favorably 10 or more and 50 or less, more favorably 10 or more and 40 or less.

The content (% by mass) of the polyoxyethylene alkyl ether in the ink is favorably 0.05% by mass or more and 2.0% by mass or less, more favorably 0.2% by mass or more and 1.0% by mass or less based on the total mass of the ink. If the content of the polyoxyethylene alkyl ether is less than 0.05% by mass, there is a tendency for the effect of stably retaining the dispersed state of the pigment particle to be insufficient. In addition, there is also a tendency for the effect of reducing the penetration rate of the ink to be insufficient. As a result, the effect to more improve the ozone resistance may not be sufficiently achieved in some cases. If the content of the polyoxyethylene alkyl ether is more than 2.0% by mass on the other hand, the number of polyoxyethylene alkyl ether molecules adsorbed on the surface of the pigment particle increase, and so there is a tendency for the nonionic nature of the surface of the pigment particle to be strong. As a result, the bonding of the pigment particle and the anionic group contributing to the dispersion thereof to a cationic substance contained in a recording medium becomes weak, and so the pigment particle easily penetrates into the coating layer in the art paper in particular, whereby the color developability of the image may be somewhat lowered in some cases.

The HLB value of the polyoxyethylene alkyl ether as determined by Griffin's method is favorably 13 or more, more favorably 15.0 or more. If the HLB value is less than 13.0, the effect to relax the fixing of a dot becomes small, and so the effect to improve the color developability may not be achieved in some cases. Incidentally, the upper limit of the HLB value is 20.0 as described below. Therefore, the upper limit of the HLB value of the polyoxyethylene alkyl ether favorably used in the present invention is also 20.0 or less.

Here, Griffin's method prescribing the HLB value of a surfactant will be described. The HLB value by Griffin's method is determined from a formula weight of a hydrophilic group and a molecular weight of a surfactant according to the following equation (2). This HLB value indicates the degree of hydrophilicity or lipophilicity of the surfactant in a range of from 0.0 to 20.0. The lower the HLB value, the higher the lipophilicity (hydrophobicity) of the surfactant. On the other hand, the higher the HLB value, the higher the hydrophilicity of the surfactant.

HLB value=20×(Formula weight of hydrophilic group of surfactant)/(Molecular weight of surfactant).   Equation (2):

Ink Cartridge:

The ink cartridge according to the present invention is provided with an ink and an ink storage portion storing this ink. The ink stored in the ink storage portion is the above-described ink according to the present invention. The structure of the ink cartridge is such that the ink storage portion is formed by an ink storage chamber storing a liquid ink and a negative pressure generating member storage chamber storing a negative pressure generating member holding the ink in the interior thereof by a negative pressure. The ink storage portion of the ink cartridge may also be so constructed that the whole amount of the ink stored is held in the negative pressure generating member without providing the ink storage chamber storing a liquid ink. In addition, the ink cartridge may be constructed so as to have an ink storage portion and a recording head.

Ink Jet Recording Method:

The ink jet recording method according to the present invention is a method of ejecting the above-described ink according to the present invention by a recording head of an ink jet system to record an image on a recording medium. Examples of an ink ejecting system include a system in which mechanical energy is applied to an ink and a system in which thermal energy is applied to an ink. Processes of the ink jet recording method may be those publicly known except that the ink according to the present invention is used. As the recording medium, any recording medium can be used. However, paper having permeability, such as plain paper or a recording medium (glossy paper or art paper) having a coating layer, is favorably used. In particular, the recording medium having the coating layer, by which at least a part of a pigment particle in an ink can be caused to be present on the surface of the recording medium and in the neighborhood thereof, is favorably used. Such a recording medium may be selected according to intended use of a recorded article with an image recorded thereon. Examples thereof include glossy paper suitable for obtaining an image having a feeling of glossiness of a photographic image quality and art paper making good use of the feeling of a base material (like drawing paper, canvas matrix or Japanese paper) for expressing a picture, a photograph and/or a graphic image according to preference.

EXAMPLES

The present invention will hereinafter be described more specifically by the following Examples and Comparative Examples. However, the present invention is not limited by the following examples unless going beyond the gist of the present invention. Incidentally, all designations of "part" or "parts" and "%" as to amounts of components described below are based on mass unless expressly noted. In addition, "PV FAST BLUE" (trade name; product of Clariant) was used as C.I. Pigment Blue 15:3, "Hostparm Pink" (trade name; product of Clariant) was used as C.I. Pigment Red 122, and "CROMOPHTAL YELLOW 8GT" (trade name; product of Ciba Specialty Chemicals) was used as C.I. Pigment Yellow 128.

Preparation of Wet Cake:

Wet Cakes 1 to 12 each containing a pigment particle were respectively prepared according to the following procedure. Incidentally, "ULREA SS-11" (trade name; manufactured by M Technique) was used as a microreactor.

Wet Cake 1:

As Liquid A, 1,500 mL of pure water was prepared. In addition, 90 mL of a solution with 3.0 parts of C.I. Pigment Blue 15:3 dissolved in 97.0 parts of concentrated sulfuric acid (98%) was provided as Liquid B. The temperatures of Liquid A and Liquid B were set to 5° C. and 25° C., respectively, and the flow rates of Liquid A and Liquid B were set to 400 mL/min and 3 mL/min, respectively, to treat both liquids by means of a microreactor according to the build-up process. After the treatment, filtration was conducted by a Buchner funnel to obtain a paste. After the resultant paste was washed 3 times with ion-exchanged water, a proper amount of ion-exchanged water was added to prepare Wet Cake 1 whose pigment particle content was 15.0%.

Wet Cake 2:

As Liquid A, 1,500 mL of pure water was prepared. In addition, 90 mL of a solution with 3.0 parts of C.I. Pigment Blue 15:3 dissolved in 97.0 parts of concentrated sulfuric acid (98%) was provided as Liquid B. Further, 300 mL of a 6 mol/L aqueous solution of sodium hydroxide was provided as Liquid C. The temperatures of Liquid A, Liquid B and Liquid C were set to 5° C., 25° C. and 25° C., respectively, and the flow rates of Liquid A, Liquid B and Liquid C were set to 400 mL/min, 3 mL/min and 10 mL/min, respectively, to treat these liquids by means of a microreactor according to the build-up process. After the treatment, filtration was conducted by a Buchner funnel to obtain a paste. After the resultant paste was washed 3 times with ion-exchanged water, a proper amount of ion-exchanged water was added to prepare Wet Cake 2 whose pigment particle content was 15.0%. Hydroxy groups were bonded to the surface of the pigment particle in Wet Cake 2.

Wet Cake 3:

As Liquid A, 1,500 mL of pure water was prepared. In addition, 90 mL of a solution with 3.0 parts of C.I. Pigment Blue 15:3 dissolved in 97.0 parts of fuming sulfuric acid (5.7% $SO_3$) was provided as Liquid B. The temperatures of Liquid A and Liquid B were set to 5° C. and 25° C., respectively, and the flow rates of Liquid A and Liquid B were set to 400 mL/min and 3 mL/min, respectively, to treat both liquids by means of a microreactor according to the build-up process. After the treatment, filtration was conducted by a Buchner funnel to obtain a paste. After the resultant paste was washed 3 times with ion-exchanged water, a proper amount of ion-exchanged water was added to prepare Wet Cake 3 whose pigment particle content was 15.0%. Sulfonic groups were bonded to the surface of the pigment particle in Wet Cake 3.

Wet Cake 4:

As Liquid A, 1,500 mL of pure water was prepared. In addition, 90 mL of a solution with 3.0 parts of C.I. Pigment Blue 15:3 dissolved in 97.0 parts of fuming sulfuric acid (5.7% $SO_3$) was provided as Liquid B. The temperatures of Liquid A and Liquid B were set to 90° C. and 25° C., respectively, and the flow rates of Liquid A and Liquid B were set to 400 mL/min and 3 mL/min, respectively, to treat both liquids by means of a microreactor according to the build-up process. After the treatment, filtration was conducted by a Buchner funnel to obtain a paste. After the resultant paste was washed 3 times with ion-exchanged water, a proper amount of ion-exchanged water was added to prepare Wet Cake 4 whose pigment particle content was 15.0%. Sulfonic groups were bonded to the surface of the pigment particle in Wet Cake 4.

Wet Cake 5:

As Liquid A, 1,500 mL of pure water was prepared. In addition, 90 mL of a solution with 5.0 parts of C.I. Pigment Blue 15:3 dissolved in 95.0 parts of fuming sulfuric acid (5.7% $SO_3$) was provided as Liquid B. The temperatures of Liquid A and Liquid B were set to 5° C. and 25° C., respectively, and the flow rates of Liquid A and Liquid B were set to 80 mL/min and 0.6 mL/min, respectively, to treat both liquids by means of a microreactor according to the build-up process. After the treatment, filtration was conducted by a Buchner funnel to obtain a paste. After the resultant paste was washed 3 times with ion-exchanged water, a proper amount of ion-exchanged water was added to prepare Wet Cake 5 whose pigment particle content was 15.0%. Sulfonic groups were bonded to the surface of the pigment particle in Wet Cake 5.

Wet Cake 6:

As Liquid A, 1,500 mL of pure water was prepared. In addition, 90 mL of a solution with 1.0 part of C.I. Pigment Blue 15:3 dissolved in 99.0 parts of fuming sulfuric acid (5.7% $SO_3$) was provided as Liquid B. The temperatures of Liquid A and Liquid B were set to 5° C. and 25° C., respectively, and the flow rates of Liquid A and Liquid B were set to 400 mL/min and 3 mL/min, respectively, to treat both liquids by means of a microreactor according to the build-up process. After the treatment, filtration was conducted by a Buchner funnel to obtain a paste. After the resultant paste was washed 3 times with ion-exchanged water, a proper amount of ion-exchanged water was added to prepare Wet Cake 6 whose pigment particle content was 15.0%. Sulfonic groups were bonded to the surface of the pigment particle in Wet Cake 6.

Wet Cake 7:

As Liquid A, 1,500 mL of methanol was prepared. In addition, 90 mL of a solution with 2.0 parts of C.I. Pigment Red 122 dissolved in 98.0 parts of concentrated sulfuric acid (98%) was provided as Liquid B. The temperatures of Liquid A and Liquid B were set to −25° C. and 25° C., respectively, and the flow rates of Liquid A and Liquid B were set to 400 mL/min and 5 mL/min, respectively, to treat both liquids by means of a microreactor according to the build-up process. After the treatment, filtration was conducted by a Buchner funnel to obtain a paste. After the resultant paste was washed 3 times with ion-exchanged water, a proper amount of ion-exchanged water was added to prepare Wet Cake 5 whose pigment particle content was 15.0%.

Wet Cake 8:

As Liquid A, 1,500 mL of methanol was prepared. In addition, 90 mL of a solution with 3.0 parts of C.I. Pigment Red 122 dissolved in 97.0 parts of concentrated sulfuric acid (98%) was provided as Liquid B. Further, 300 mL of a 6 mol/L aqueous solution of sodium hydroxide was provided as Liquid C. The temperatures of Liquid A, Liquid B and Liquid C were set to −10° C., 20° C. and 20° C., respectively, and the flow rates of Liquid A, Liquid B and Liquid C were set to 400 mL/min, 10 mL/min and 10 mL/min, respectively, to treat these liquids by means of a microreactor according to the build-up process. After the treatment, filtration was conducted by a Buchner funnel to obtain a paste. After the resultant paste was washed 3 times with ion-exchanged water, a proper amount of ion-exchanged water was added to prepare Wet Cake 8 whose pigment particle content was 15.0%. Hydroxy groups were bonded to the surface of the pigment particle in Wet Cake 8.

Wet Cake 9:

As Liquid A, 1,500 mL of a solution (1.0% acetic acid solution) with acetic acid dissolved in methanol was prepared. In addition, 90 mL of a solution with 1.2 parts of C.I. Pigment Yellow 128 dissolved in a mixed liquid of 87.8 parts of dimethyl sulfoxide (special grade chemicals), 8.0 parts of 0.5 mol/L potassium hydroxide (ethanol solution) and 5.1 parts of ion-exchanged water was provided as Liquid B. The temperatures of Liquid A and Liquid B were set to 5° C. and 25° C., respectively, and the flow rates of Liquid A and Liquid B were set to 50 mL/min and 3 mL/min, respectively, to treat both liquids by means of a microreactor according to the build-up process. After the treatment, filtration was conducted by a Buchner funnel to obtain a paste. After the resultant paste was washed 3 times with ion-exchanged water, a proper amount of ion-exchanged water was added to prepare Wet Cake 9 whose pigment particle content was 15.0%.

Wet Cake 10:

As Liquid A, 1,500 mL of pure water was prepared. In addition, 90 mL of a solution with 3.0 parts of C.I. Pigment Blue 15:3 dissolved in 97.0 parts of concentrated sulfuric acid (98%) was provided as Liquid B. Further, 300 mL of a 6 mol/L aqueous solution of sodium hydroxide was provided as Liquid C. The temperatures of Liquid A, Liquid B and Liquid C were set to 90° C., 25° C. and 25° C., respectively, and the flow rates of Liquid A, Liquid B and Liquid C were set to 400 mL/min, 3 mL/min and 10 mL/min, respectively, to treat these liquids by means of a microreactor according to the build-up process. After the treatment, filtration was conducted by a Buchner funnel to obtain a paste. After the resultant paste was washed 3 times with ion-exchanged water, a proper amount of ion-exchanged water was added to prepare Wet Cake 10 whose pigment particle content was 15.0%. Hydroxy groups were bonded to the surface of the pigment particle in Wet Cake 10.

Wet Cake 11:

As Liquid A, 1,500 mL of a solution (1.0% acetic acid solution) with acetic acid dissolved in methanol was prepared. In addition, 90 mL of a solution with 1.2 parts of C.I. Pigment Yellow 128 dissolved in a mixed liquid of 87.8 parts of dimethyl sulfoxide (special grade chemicals), 8.0 parts of 0.5 mol/L potassium hydroxide (ethanol solution) and 5.1 parts of ion-exchanged water was provided as Liquid B. Further, 300 mL of a 6 mol/L aqueous solution of sodium hydroxide was provided as Liquid C. The temperatures of Liquid A, Liquid B and Liquid C were set to 5° C., 25° C. and 25° C., respectively, and the flow rates of Liquid A, Liquid B and Liquid C were set to 400 mL/min, 10 mL/min and 10 mL/min, respectively, to treat these liquids by means of a microreactor according to the build-up process. After the treatment, filtration was conducted by a Buchner funnel to obtain a paste. After the resultant paste was washed 3 times with ion-exchanged water, a proper amount of ion-exchanged water was added to prepare Wet Cake 11 whose pigment particle content was 15.0%. Hydroxy groups were bonded to the surface of the pigment particle in Wet Cake 11.

Wet Cake 12:

As Liquid A, 1,500 mL of pure water was prepared. In addition, 90 mL of a solution with 1.0 part of C.I. Pigment Blue 15:3 dissolved in 99.0 parts of fuming sulfuric acid (5.7% $SO_3$) was provided as Liquid B. The temperatures of Liquid A and Liquid B were set to 5° C. and 25° C., respectively, and the flow rates of Liquid A and Liquid B were set to 500 mL/min and 6 mL/min, respectively, to treat both liquids by means of a microreactor according to the build-up process. After the treatment, filtration was conducted by a Buchner funnel to obtain a paste. After the resultant paste was washed 3 times with ion-exchanged water, a proper amount of ion-exchanged water was added to prepare Wet Cake 12 whose pigment particle content was 15.0%. Sulfonic groups were bonded to the surface of the pigment particle in Wet Cake 12.

Preparation of Pigment Dispersion Liquid:

Pigment Dispersion Liquid 1:

Seventy parts of Wet Cake 1, 24.0 parts of an aqueous solution (resin (solid) content: 25.0%) of Resin Dispersant 1 and 6.0 parts of water were mixed. Incidentally, Resin Dispersant 1 is that obtained by neutralizing a styrene-acrylic acid copolymer (trade name "JONCRYL 680"; acid value: 215 mg KOH/g, weight average molecular weight: 4,900, product of BASF) with potassium hydroxide so as to give a neutralization equivalent of 0.85. After a dispersion treatment was conducted for 60 minutes at 3,500 rpm by means of a high-speed rotation type dispersing machine (trade name "CLM-2.2S", manufactured by M Technique), centrifugal separation was conducted for 30 minutes at 5,000 rpm to remove an aggregation component. The thus-treated mixture was diluted with ion-exchanged water to obtain Pigment Dispersion Liquid 1 whose pigment content and water-soluble resin (solid) content were 10.0% and 6.0%, respectively.

Pigment Dispersion Liquid 2:

Seventy parts of Wet Cake 2 and 30.0 parts of water were mixed. After a dispersion treatment was conducted for 60 minutes at 3,500 rpm by means of a high-speed rotation type dispersing machine (trade name "CLM-2.2S", manufactured by M Technique), centrifugal separation was conducted for 30 minutes at 5,000 rpm to remove an aggregation component. The thus-treated mixture was diluted with ion-exchanged water to obtain Pigment Dispersion Liquid 2 whose pigment content was 10.0%.

Pigment Dispersion Liquid 3:

Pigment Dispersion Liquid 3 whose pigment content was 10.0% was obtained in the same manner as in the case of "Pigment Dispersion Liquid 2" except that Wet Cake 3 adjusted to pH 8 with an aqueous solution of potassium hydroxide was used in place of Wet Cake 2.

Pigment Dispersion Liquid 4:

Pigment Dispersion Liquid 4 whose pigment content was 10.0% was obtained in the same manner as in the case of "Pigment Dispersion Liquid 2" except that Wet Cake 4 adjusted to pH 8 with an aqueous solution of potassium hydroxide was used in place of Wet Cake 2.

Pigment Dispersion Liquid 5:

Pigment Dispersion Liquid 5 whose pigment content was 10.0% was obtained in the same manner as in the case of "Pigment Dispersion Liquid 2" except that Wet Cake 5 adjusted to pH 8 with an aqueous solution of potassium hydroxide was used in place of Wet Cake 2.

Pigment Dispersion Liquid 6:

Pigment Dispersion Liquid 6 whose pigment content was 10.0% was obtained in the same manner as in the case of "Pigment Dispersion Liquid 2" except that Wet Cake 6 adjusted to pH 8 with an aqueous solution of potassium hydroxide was used in place of Wet Cake 2.

Pigment Dispersion Liquid 7:

Pigment Dispersion Liquid 7 whose pigment content and water-soluble resin (solid) content were 10.0% and 6.0%, respectively, was obtained in the same manner as in the case of "Pigment Dispersion Liquid 1" except that Wet Cake 7 was used in place of Wet Cake 1.

Pigment Dispersion Liquid 8:

Pigment Dispersion Liquid 8 whose pigment content was 10.0% was obtained in the same manner as in the case of "Pigment Dispersion Liquid 2" except that Wet Cake 8 was used in place of Wet Cake 2.

Pigment Dispersion Liquid 9:

Pigment Dispersion Liquid 9 whose pigment content and water-soluble resin (solid) content were 10.0% and 6.0%, respectively, was obtained in the same manner as in the case of "Pigment Dispersion Liquid 1" except that Wet Cake 9 was used in place of Wet Cake 1.

Pigment Dispersion Liquid 10:

Ten parts of C.I. Pigment Blue 15:3, 50.0 parts of an aqueous solution (resin (solid) content: 25.0%) of Resin Dispersant 1 and 40.0 parts of water were mixed. After the resultant mixture was dispersed for 3 hours by means of a batch type vertical sand mill. After a dispersion treatment was conducted for 60 minutes at 3,500 rpm by means of a high-speed rotation type dispersing machine (trade name "CLM-2.2S", manufactured by M Technique), centrifugal separation was conducted for 30 minutes at 5,000 rpm to remove an aggregation component. The thus-treated mixture was then filtered under pressure through a cellulose acetate filter (product of Advantec) having a pore size of 3.0 μm to obtain Pigment Dispersion Liquid 10 whose pigment content and water-soluble resin (solid) content were 10.0% and 10.0%, respectively.

Pigment Dispersion Liquid 11:

A commercially available pigment dispersion liquid (CAB-O-JET250C, product of Cabot) containing a self-dispersible pigment whose pigment species was C.I. Pigment Blue 15:4 was diluted with ion-exchanged water to obtain Pigment Dispersion Liquid 11 whose pigment content was 10.0%. Sulfonic groups were bonded to the surface of the pigment particle in Pigment Dispersion Liquid 11 through phenylene groups.

Pigment Dispersion Liquid 12:

Pigment Dispersion Liquid 12 whose pigment content was 10.0% was obtained in the same manner as in the case of "Pigment Dispersion Liquid 2" except that Wet Cake 10 was used in place of Wet Cake 2.

Pigment Dispersion Liquid 13:

Pigment Dispersion Liquid 13 whose pigment content and water-soluble resin (solid) content were 10.0% and 10.0%, respectively, was obtained in the same manner as in the case of "Pigment Dispersion Liquid 10" except that C.I. Pigment Red 122 was used in place of C.I. Pigment Blue 15:3.

Pigment Dispersion Liquid 14:

A commercially available pigment dispersion liquid (CAB-O-JET265M, product of Cabot) containing a self-dispersible pigment whose pigment species was C.I. Pigment Red 122 was diluted with ion-exchanged water to obtain Pigment Dispersion Liquid 14 whose pigment content was 10.0%. Sulfonic groups were bonded to the surface of the pigment particle in Pigment Dispersion Liquid 14 through phenylene groups.

Pigment Dispersion Liquid 15:

Pigment Dispersion Liquid 15 whose pigment content and water-soluble resin (solid) content were 10.0% and 10.0%, respectively, was obtained in the same manner as in the case of "Pigment Dispersion Liquid 10" except that C.I. Pigment Yellow 128 was used in place of C.I. Pigment Blue 15:3.

Pigment Dispersion Liquid 16:

Ten parts of C.I. Pigment Red 122 was dispersed in 100 parts of an aqueous dispersion liquid (resin (solid) content: 20.0%) containing a fine acrylic resin particle (Mowinyl 9000, product of Clariant Polymer). This dispersion liquid was heated to about 100° C. to incorporate the coloring material in the interior of the fine resin particle, thereby obtaining a fine resin particle with the pigment incorporated therein. The resultant liquid was concentrated to obtain Pigment Dispersion Liquid 16 whose pigment content and water-soluble resin (solid) content were 10.0% and 20.0%, respectively.

Pigment Dispersion Liquid 17:

Pigment Dispersion Liquid 17 whose pigment content was 10.0% was obtained in the same manner as in the case of "Pigment Dispersion Liquid 2" except that Wet Cake 11 was used in place of Wet Cake 2.

Pigment Dispersion Liquid 18:

Pigment Dispersion Liquid 18 whose pigment content was 10.0% was obtained in the same manner as in the case of "Pigment Dispersion Liquid 2" except that Wet Cake 12 was used in place of Wet Cake 2.

Pigment Dispersion Liquid 19:

A commercially available pigment dispersion liquid (CAB-O-JET450C, product of Cabot) containing a self-dispersible pigment whose pigment species was C.I. Pigment Blue 15:4 was diluted with ion-exchanged water to obtain Pigment Dispersion Liquid 19 whose pigment content was 10.0%. Functional groups containing a phenylene group and two phosphonic groups were bonded to the surface of the pigment particle in Pigment Dispersion Liquid 19.

Pigment Dispersion Liquid 20:

A commercially available pigment dispersion liquid (CAB-O-JET740Y, product of Cabot) containing a self-dispersible pigment whose pigment species was C.I. Pigment Yellow 155 was diluted with ion-exchanged water to obtain Pigment Dispersion Liquid 20 whose pigment content was 10.0%. Carboxy groups were bonded to the surface of the pigment particle in Pigment Dispersion Liquid 20.

Preparation of Ink (Examples 1 to 38, and Comparative Examples 1 to 13

After the respective components (unit: %) shown in Tables 1-1 to 1-4 were mixed and sufficiently stirred, the resultant respective mixtures were filtered under pressure through a membrane filter (trade name "HDCII FILTER", product of Pall) having a pore size of 1.2 μm to prepare respective inks. Details of the trade names in Tables 1-1 to 1-4 are shown below.

"DISPERSE AID W-28": Dispersant, product of SAN NOPCO, "Disper BYK184": Resin dispersant, product of BYK Japan, "NIKKOL BC-202: Polyoxyethylene cetyl ether, product of Nikko Chemicals, HLB value: 15.7, the number of moles of an ethylene oxide group added: 20, "AQUALEN 1435": Antifoaming agent, product of KYOEISHA CHEMICAL,
"ACETYLENOL E100": Acetylene glycol-based surfactant, product of Kawaken Fine Chemicals,
"PROXEL GXL(S)": Preservative, product of Arch Chemicals.

Characteristics of the inks are shown in lower parts of Tables 1-1 to 1-4. An image of a pigment particle was photographed through a transmission electron microscope (TEM) or a scanning electron microscope (SEM) to regard the longest diameter extending through the center of gravity of a primary particle thereof as a particle diameter of the primary particle. The particle diameter of the primary particle was determined as an average value of particle diameters of 30 primary particles. From the image of the pigment particle photographed, the longest diameter and the shortest diameter extending through the center of gravity of the primary particle were regarded as a major axis a and a minor axis b, respectively, and a ratio (minor axis b)/(major axis a) of the primary particle was determined as an average value of 30 primary particles. Dielectric constants of water and a water-soluble organic solvent were measured at 25° C. by means of a dielectric constant meter (trade name "BI-870"; manufactured by BROOKHAVEN INSTRUMENTS CORPORATION). A 50% cumulative particle diameter ($D_{50}$) in a particle diameter distribution of a pigment particle in each ink was measured by means of a particle diameter distribution meter (trade name "NANOTRAC UPA150EX; manufactured by NIKKISO) of a dynamic light scattering system.

TABLE 1-1

Composition and characteristics of ink

| | Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Kind of pigment dispersion liquid | 6 | 3 | 4 | 5 | 6 | 8 | 1 | 7 | 9 | 6 | 6 | 6 | 6 |
| Amount of pigment dispersion liquid | 30.0 | 30.0 | 30.0 | 30.0 | 30.0 | 30.0 | 30.0 | 30.0 | 30.0 | 30.0 | 30.0 | 30.0 | 30.0 |
| Polyethylene glycol (Mn 1,000) | | | | | | | | | | | | | |
| 1,6-Hexanediol | | | | | | | | | | | | | |
| Triethylene glycol monobutyl ether | | | | | | | | | | | | | |
| 1,2-Hexanediol | 5.0 | 2.0 | 3.0 | 3.0 | 3.0 | 0.5 | 3.0 | 3.0 | 3.0 | 3.0 | 3.0 | 3.0 | 3.0 |
| Propylene glycol | | | | | | | | | | | | | |
| Isopropyl alcohol | | | | | | | | | | | | | |
| Triethylene glycol | 5.0 | 3.0 | 5.0 | 5.0 | 5.0 | | 5.0 | 5.0 | 5.0 | 5.0 | 5.0 | 5.0 | 5.0 |
| 3-Methyl-1,5-pentanediol | | | | | | | | | | | | | |
| 1,5-Pentanediol | | | | | | | | | | | | | |
| 2-Pyrrolidone | 5.0 | 3.0 | 5.0 | 5.0 | 5.0 | 5.0 | 5.0 | 5.0 | 5.0 | 5.0 | 5.0 | 5.0 | 5.0 |
| 1,2,6-Hexanetriol | | | | | | | | | | | | | |
| 1,2-Propanediol | | | | | | | | | | | | | |
| Diethylene glycol | | | | | | 5.0 | | | | | | | |
| Trimethylolpropane | | | | | | | | | | | | | |
| Glycerol | 5.0 | 5.0 | 5.0 | 5.0 | 5.0 | 5.0 | 5.0 | 5.0 | 5.0 | 5.0 | 5.0 | 5.0 | 5.0 |
| Ethyleneurea | 5.0 | | 5.0 | 5.0 | 5.0 | 5.0 | 5.0 | 5.0 | 5.0 | 5.0 | 5.0 | 5.0 | 5.0 |
| Urea | | | | | | | | | | | | | |
| DISPERSE AID W-28 | | | | | | | | | | | | | |
| Disper BYK184 | | | | | | | | | | | | | |
| NIKKOL BC-20 | 1.0 | 1.0 | 1.0 | 1.0 | 1.0 | 1.0 | 1.0 | 1.0 | 1.0 | | 0.04 | 0.05 | 2.0 |
| AQUALEN 1435 | | | | | | | | | | | | | |
| ACETYLENOL E100 | 0.2 | 0.2 | 0.2 | 0.2 | 0.2 | 0.2 | 0.2 | 0.2 | 0.2 | 0.2 | 0.2 | 0.2 | 0.2 |
| PROXEL GXL(S) | 0.2 | 0.2 | 0.2 | 0.2 | 0.2 | 0.2 | 0.2 | 0.2 | 0.2 | 0.2 | 0.2 | 0.2 | 0.2 |
| Ion-exchanged water | 43.6 | 55.6 | 45.6 | 45.6 | 45.6 | 48.1 | 45.6 | 45.6 | 45.6 | 46.6 | 46.56 | 46.55 | 44.6 |
| Particle diameter of primary particle (nm) | 11 | 16 | 35 | 21 | 11 | 15 | 11 | 15 | 17 | 15 | 11 | 11 | 11 |
| b/a of primary particle | 0.93 | 0.81 | 0.80 | 0.70 | 0.93 | 0.82 | 0.90 | 0.84 | 0.75 | 0.80 | 0.93 | 0.93 | 0.93 |
| Content of water in ink (%) | 70.6 | 82.6 | 72.6 | 72.6 | 72.6 | 75.1 | 70.8 | 70.8 | 70.8 | 73.6 | 73.56 | 73.55 | 71.6 |
| Dielectric constant $\epsilon_{mix}$ | 66 | 72 | 68 | 68 | 68 | 70 | 67 | 67 | 67 | 68 | 68 | 68 | 67 |
| Content of solvent whose dielectric constant is 25.0 or less (%) | 10.0 | 5.0 | 8.0 | 8.0 | 8.0 | 0.5 | 8.0 | 8.0 | 8.0 | 8.0 | 8.0 | 8.0 | 8.0 |
| 50% Cumulative particle diameter ($D_{50}$) | 66 | 54 | 70 | 65 | 54 | 62 | 66 | 66 | 58 | 58 | 62 | 58 | 60 |

TABLE 1-2

Composition and characteristics of ink

| | Example | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| Kind of pigment dispersion liquid | 6 | 6 | 6 | 6 | 6 | 6 | 6 | 6 | 6 | 6 | 6 | 6 | 6 |
| Amount of pigment dispersion liquid | 30.0 | 30.0 | 30.0 | 30.0 | 30.0 | 30.0 | 30.0 | 30.0 | 30.0 | 30.0 | 30.0 | 30.0 | 30.0 |
| Polyethylene glycol (Mn 1,000) | | | | | | 3.0 | | | | | | | |
| 1,6-Hexanediol | | | | | | | 3.0 | | | | | | |
| Triethylene glycol monobutyl ether | | | | | | | | 3.0 | | | | | |
| 1,2-Hexanediol | 3.0 | 0.1 | 0.2 | 10.0 | 10.1 | | | | | | | | |

TABLE 1-2-continued

Composition and characteristics of ink

| | Example | | | | | | | | | | | | |
|---|---|---|---|---|---|---|---|---|---|---|---|---|---|
| | 14 | 15 | 16 | 17 | 18 | 19 | 20 | 21 | 22 | 23 | 24 | 25 | 26 |
| Propylene glycol | | | | | | | | | 3.0 | | | | |
| Isopropyl alcohol | | | | | | | | | | 3.0 | | | |
| Triethylene glycol | 5.0 | 5.0 | 5.0 | | | 5.0 | 5.0 | 5.0 | 5.0 | 5.0 | 5.0 | 5.0 | 5.0 |
| 3-Methyl-1,5-pentanediol | | | | | | | | | | | 3.0 | | |
| 1,5-Pentanediol | | | | | | | | | | | | 3.0 | |
| 2-Pyrrolidone | 5.0 | 5.0 | 5.0 | 3.0 | 3.0 | 5.0 | 5.0 | 5.0 | 5.0 | 5.0 | 5.0 | 5.0 | 5.0 |
| 1,2,6-Hexanetriol | | | | | | | | | | | | | 3.0 |
| 1,2-Propanediol | | | | | | | | | | | | | |
| Diethylene glycol | | | | 3.0 | 3.0 | | | | | | | | |
| Trimethylolpropane | | | | | | | | | | | | | |
| Glycerol | 5.0 | 5.0 | 5.0 | 5.0 | 5.0 | 5.0 | 5.0 | 5.0 | 5.0 | 5.0 | 5.0 | 5.0 | 5.0 |
| Ethyleneurea | 5.0 | 5.0 | 5.0 | | | 5.0 | 5.0 | 5.0 | 5.0 | 5.0 | 5.0 | 5.0 | 5.0 |
| Urea | | | | | | | | | | | | | |
| DISPERSE AID W-28 | | | | | | | | | | | | | |
| Disper BYK184 | | | | | | | | | | | | | |
| NIKKOL BC-20 | 3.0 | 1.0 | 1.0 | 1.0 | 1.0 | 1.0 | 1.0 | 1.0 | 1.0 | 1.0 | 1.0 | 1.0 | 1.0 |
| AQUALEN 1435 | | | | | | | | | | | | | |
| ACETYLENOL E100 | 0.2 | 0.2 | 0.2 | 0.2 | 0.2 | 0.2 | 0.2 | 0.2 | 0.2 | 0.2 | 0.2 | 0.2 | 0.2 |
| PROXEL GXL(S) | 0.2 | 0.2 | 0.2 | 0.2 | 0.2 | 0.2 | 0.2 | 0.2 | 0.2 | 0.2 | 0.2 | 0.2 | 0.2 |
| Ion-exchanged water | 43.6 | 48.5 | 48.4 | 47.6 | 47.5 | 45.6 | 45.6 | 45.6 | 45.6 | 45.6 | 45.6 | 45.6 | 45.6 |
| Particle diameter of primary particle (nm) | 11 | 11 | 11 | 11 | 11 | 11 | 11 | 11 | 11 | 11 | 11 | 11 | 11 |
| b/a of primary particle | 0.93 | 0.93 | 0.93 | 0.93 | 0.93 | 0.93 | 0.93 | 0.93 | 0.93 | 0.93 | 0.93 | 0.93 | 0.93 |
| Content of water in ink (%) | 70.6 | 75.5 | 75.4 | 74.6 | 74.5 | 72.6 | 72.6 | 72.6 | 72.6 | 72.6 | 72.6 | 72.6 | 72.6 |
| Dielectric constant $\epsilon_{mix}$ | 67 | 69 | 69 | 67 | 67 | 67 | 67 | 67 | 68 | 68 | 68 | 68 | 68 |
| Content of solvent whose dielectric constant is 25.0 or less (%) | 8.0 | 5.1 | 5.2 | 10.0 | 10.1 | 8.0 | 8.0 | 8.0 | 8.0 | 8.0 | 8.0 | 5.0 | 5.0 |
| 50% Cumulative particle diameter ($D_{50}$) | 62 | 55 | 55 | 67 | 65 | 60 | 60 | 60 | 60 | 62 | 62 | 59 | 66 |

TABLE 1-3

Composition and characteristics of ink

| | Example | | | | | | | | | | | |
|---|---|---|---|---|---|---|---|---|---|---|---|---|
| | 27 | 28 | 29 | 30 | 31 | 32 | 33 | 34 | 35 | 36 | 37 | 38 |
| Kind of pigment dispersion liquid | 6 | 6 | 6 | 6 | 6 | 6 | 17 | 2 | 18 | 6 | 6 | 1 |
| Amount of pigment dispersion liquid | 30.0 | 30.0 | 30.0 | 30.0 | 30.0 | 30.0 | 30.0 | 30.0 | 30.0 | 30.0 | 30.0 | 30.0 |
| Polyethylene glycol (Mn 1,000) | | | | | | | | | | | | |
| 1,6-Hexanediol | | | | | | | | | | | | |
| Triethylene glycol monobutyl ether | | | | | | | | | | | | |
| 1,2-Hexanediol | | | | | 2.0 | 3.0 | 3.0 | 3.0 | 3.0 | 5.0 | 10.0 | |
| Propylene glycol | | | | | | | | | | | | |
| Isopropyl alcohol | | | | | | | | | | | | |
| Triethylene glycol | 5.0 | 5.0 | 5.0 | 5.0 | | 12.0 | 5.0 | 5.0 | 5.0 | | | 5.0 |
| 3-Methyl-1,5-pentanediol | | | | | | | | | | | | |
| 1,5-Pentanediol | | | | | | | | | | | | |
| 2-Pyrrolidone | 5.0 | 5.0 | 5.0 | 5.0 | 5.0 | | 5.0 | 5.0 | 5.0 | | | 5.0 |
| 1,2,6-Hexanetriol | | | | | | | | | | | | |
| 1,2-Propanediol | 3.0 | | | | | | | | | | | |
| Diethylene glycol | | 3.0 | | | | | | | | | | |
| Trimethylolpropane | | | 3.0 | | | | | | | | | |
| Glycerol | 5.0 | 5.0 | 5.0 | 5.0 | 12.0 | 5.0 | 5.0 | 5.0 | 5.0 | 13.0 | | 5.0 |
| Ethyleneurea | 5.0 | 5.0 | 5.0 | 5.0 | | | 5.0 | 5.0 | 5.0 | | | 5.0 |
| Urea | | | | 3.0 | | | | | | | | |
| DISPERSE AID W-28 | | | | | | | | | | | | |
| Disper BYK184 | | | | | | | | | | | | |
| NIKKOL BC-20 | 1.0 | 1.0 | 1.0 | 1.0 | 1.0 | 1.0 | 1.0 | 1.0 | 1.0 | 1.0 | 1.0 | |
| AQUALEN 1435 | | | | | | | | | | | | |
| ACETYLENOL E100 | 0.2 | 0.2 | 0.2 | 0.2 | 0.2 | 0.2 | 0.2 | 0.2 | 0.2 | 0.2 | 0.2 | 0.2 |
| PROXEL GXL(S) | 0.2 | 0.2 | 0.2 | 0.2 | 0.2 | 0.2 | 0.2 | 0.2 | 0.2 | 0.2. | 0.2 | 0.2 |
| Ion-exchanged water | 45.6 | 45.6 | 45.6 | 45.6 | 49.6 | 48.6 | 45.6 | 45.6 | 45.6 | 50.6 | 58.6 | 49.6 |
| Particle diameter of primary particle (nm) | 11 | 11 | 11 | 11 | 11 | 11 | 13 | 15 | 25 | 11 | 11 | 11 |
| b/a of primary particle | 0.93 | 0.93 | 0.93 | 0.93 | 0.93 | 0.93 | 0.85 | 0.80 | 0.83 | 0.93 | 0.93 | 0.90 |
| Content of water in ink (%) | 72.6 | 72.6 | 72.6 | 72.6 | 76.6 | 75.6 | 72.6 | 72.6 | 72.6 | 77.6 | 85.6 | 74.8 |
| Dielectric constant $\epsilon_{mix}$ | 68 | 68 | 68 | 71 | 70 | 68 | 68 | 68 | 68 | 70 | 72 | 69 |
| Content of solvent whose dielectric constant is 25.0 or less (%) | 5.0 | 5.0 | 5.0 | 5.0 | 2.0 | 15.0 | 8.0 | 8.0 | 8.0 | 5.0 | 5.0 | 5.0 |
| 50% Cumulative particle diameter ($D_{50}$) | 66 | 60 | 60 | 60 | 54 | 54 | 52 | 66 | 109 | 60 | 68 | 69 |

TABLE 1-4

Composition and characteristics of ink

| | Comparative Example | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Kind of pigment dispersion liquid | 1 | 16 | 10 | 13 | 15 | 12 | 11 | 14 | 4 | 4 | 4 | 19 | 20 |
| Amount of pigment dispersion liquid | 50.0 | 30.0 | 30.0 | 30.0 | 30.0 | 30.0 | 30.0 | 30.0 | 30.0 | 30.0 | 30.0 | 30.0 | 30.0 |
| Polyethylene glycol (Mn 1,000) | | | | | | | | | 5.0 | | | | |
| 1,6-Hexanediol | | | | | | | | | | | | | |
| Triethylene glycol monobutyl ether | | 5.0 | | | | | | | 3.0 | | | | |
| 1,2-Hexanediol | | | 3.0 | 3.0 | 3.0 | 3.0 | 3.0 | 3.0 | 2.0 | 3.0 | 0.4 | 3.0 | 3.0 |
| Propylene glycol | | | | | | | | | 0.2 | | | | |
| Isopropyl alcohol | | | | | | | | | | | | | |
| Triethylene glycol | | | 5.0 | 5.0 | 5.0 | 5.0 | 5.0 | 5.0 | | 3.0 | | 5.0 | 5.0 |
| 3-Methyl-1,5-pentanediol | | | | | | | | | | | | | |
| 1,5-Pentanediol | | | | | | | | | | | | | |
| 2-Pyrrolidone | | | 5.0 | 5.0 | 5.0 | 5.0 | 5.0 | 5.0 | 3.0 | | 5.0 | 5.0 | 5.0 |
| 1,2,6-Hexanetriol | | | | | | | | | | | | | |
| 1,2-Propanediol | | | | | | | | | | | | | |
| Diethylene glycol | | 5.0 | | | | | | | | | 5.0 | | |
| Trimethylolpropane | | | | | | | | | 2.0 | | | | |
| Glycerol | | 10.0 | 5.0 | 5.0 | 5.0 | 5.0 | 5.0 | 5.0 | 10.0 | 5.0 | 5.0 | 5.0 | 5.0 |
| Ethyleneurea | | | 5.0 | 5.0 | 5.0 | 5.0 | 5.0 | 5.0 | | | 5.0 | 5.0 | 5.0 |
| Urea | | 5.0 | | | | | | | | | | | |
| DISPERSE AID W-28 | 1.0 | | | | | | | | | | | | |
| Disper BYK184 | 4.0 | | | | | | | | | | | | |
| NIKKOL BC-20 | | | 1.0 | 1.0 | 1.0 | 1.0 | 1.0 | 1.0 | 1.0 | 1.0 | 1.0 | 1.0 | 1.0 |
| AQUALEN 1435 | 0.75 | | | | | | | | | | | | |
| ACETYLENOL E100 | | | 0.2 | 0.2 | 0.2 | 0.2 | 0.2 | 0.2 | 0.2 | 0.2 | 0.2 | 0.2 | 0.2 |
| PROXEL GXL(S) | | | 0.2 | 0.2 | 0.2 | 0.2 | 0.2 | 0.2 | 0.2 | 0.2 | 0.2 | 0.2 | 0.2 |
| Ion-exchanged water | 44.25 | 45.0 | 45.6 | 45.6 | 45.6 | 45.6 | 45.6 | 45.6 | 43.4 | 57.6 | 48.2 | 45.6 | 45.6 |
| Particle diameter of primary particle (nm) | 11 | 69 | 59 | 64 | 69 | 38 | 34 | 32 | 35 | 35 | 35 | 53 | 67 |
| b/a of primary particle | 0.90 | 0.61 | 0.63 | 0.65 | 0.65 | 0.71 | 0.65 | 0.64 | 0.80 | 0.80 | 0.80 | 0.60 | 0.60 |
| Content of water in ink (%) | 86.25 | 66.0 | 69.6 | 69.6 | 69.6 | 72.6 | 72.6 | 72.6 | 70.4 | 84.6 | 75.2 | 72.6 | 72.6 |
| Dielectric constant $\epsilon_{mix}$ | 79 | 70 | 67 | 67 | 67 | 68 | 68 | 68 | 65 | 73 | 70 | 68 | 68 |
| Content of solvent whose dielectric constant is 25.0 or less (%) | 0.0 | 5.0 | 8.0 | 8.0 | 8.0 | 8.0 | 8.0 | 8.0 | 10.2 | 6.0 | 0.4 | 8.0 | 8.0 |
| 50% Cumulative particle diameter ($D_{50}$) | 50 | 122 | 96 | 102 | 86 | 70 | 90 | 98 | 68 | 66 | 65 | 90 | 200 |

Evaluation:

An ink cartridge charged with each of the inks obtained above was installed in an ink jet recording apparatus (trade name "PIXUS Pro9500 Mark II", manufactured by Canon Inc.) provided with a recording head for ejecting an ink by the action of thermal energy. In this ink jet recording apparatus, an image recorded under such a condition that resolution is 600 dpi×600 dpi, and eight ink droplets each of which is 3.5 ng are applied to a unit region of 1/600 inch×1/600 inch is defined as "recording duty being 100%". A pattern containing two solid images of 50% and 100% duties was recorded on each of glossy paper and art paper. Incidentally, as the glossy paper, "CANON PHOTOGRAPHIC PAPER•GLOSS PRO[PLATINUM GRADE] PT101" (trade name, product of Canon Inc.) was used. As the art paper, "FINE ART PAPER•PHOTOG" (trade name, product of Canon Inc.) was used. After the resultant recorded articles were naturally dried for 24 hours, the following respective evaluations were made. Incidentally, a spectrophotometer (trade name "Spectrolino", manufactured by Gretag Macbeth) based on the L*a*b* color space prescribed by CIE was used for colorimetry of the images. In respective color inks of cyan, magenta and yellow each using an organic pigment as a coloring material, molecular structures of the pigments that are coloring materials are generally different from one another, and an acceptable level varies depending on the hue even from the viewpoint of human visual properties. Accordingly, with respect to chroma used as an index to color developability and ozone resistance, it is appropriate to set different evaluation criteria according to the colors of the respective inks. From such a reason, evaluation criteria for color developability and ozone resistance were set according to the colors of the inks. The evaluation criteria of the respective evaluation items are shown in Table 2. In the present invention, in the evaluation criteria of the following respective evaluation items, "C" was regarded as an unacceptable level, "B" was regarded as an acceptable level, "A" was regarded as an excellent level, and "AA" was regarded as a particularly excellent level. Evaluation results are shown in Tables 3-1 and 3-2.

Color Developability on Glossy Paper:

With respect to the solid image whose recording duty was 100% in the recorded article obtained by using the glossy paper, a value of chroma (c*) was measured under conditions of a light source D50 to evaluate the color developability on the glossy paper.

Color Developability on Art Paper:

With respect to the solid image whose recording duty was 100% in the recorded article obtained by using the art paper, a value of chroma (c*) was measured under conditions of a light source D50 to evaluate the color developability on the art paper.

Ozone Resistance:

The recorded article obtained by using the glossy paper was put in an ozone fadeometer (Suga Test Instruments) and exposed to ozone for 300 hours under conditions of an ozone concentration of 5 ppm. With respect to the solid image whose recording duty was 50% in the recorded article before and after the exposure, optical density values were measured to calculate a residual ratio of the optical density according to an equation:

Residual ratio (%)=(Optical density after exposure)/(Optical density before exposure)×100, thereby evaluating the ozone resistance.

TABLE 2

Evaluation criteria

| | Evaluation | Magenta ink | Cyan ink | Yellow ink |
|---|---|---|---|---|
| Color *1 developability on glossy paper | A | 85 or more | 73 or more | 95 or more |
| | B | More than 82 and less than 85 | More than 71 and less than 73 | More than 90 and less than 95 |
| | C | 82 or less | 71 or less | 90 or less |
| Color *2 developability on art paper | A | 75 or more | 63 or more | 85 or more |
| | B | More than 72 and less than 75 | More than 61 and less than 63 | More than 82 and less than 85 |
| | C | 72 or less | 61 or less | 82 or less |
| Ozone *3 resistance | AA | 95% or less | 85% or less | |
| | A | 90% or more and less than 95% | 80% or more and less than 85% | |
| | B | 80% or more and less than 90% | 70% or more and less than 80% | |
| | C | Less than 80% | Less than 70% | |

*1 Evaluation by the chroma
*2 Evaluation by the chroma
*3 Evaluation by the residual ratio of the optical density.

TABLE 3-1

Evaluation results

| | | Color developability | | Ozone resistance |
|---|---|---|---|---|
| | | Glossy paper | Art paper | |
| Example | 1 | A | A | A |
| | 2 | A | B | AA |
| | 3 | B | A | A |
| | 4 | A | A | A |
| | 5 | A | A | AA |
| | 6 | A | A | A |
| | 7 | A | A | B |
| | 8 | A | A | B |
| | 9 | A | A | B |
| | 10 | A | A | B |
| | 11 | A | A | B |
| | 12 | A | A | AA |
| | 13 | A | A | AA |
| | 14 | A | B | AA |
| | 15 | A | B | AA |
| | 16 | A | A | AA |
| | 17 | A | A | AA |
| | 18 | B | B | AA |
| | 19 | A | B | AA |
| | 20 | A | B | AA |
| | 21 | A | B | AA |
| | 22 | A | B | AA |
| | 23 | A | B | AA |
| | 24 | A | B | AA |
| | 25 | A | B | AA |
| | 26 | A | B | AA |
| | 27 | A | B | AA |
| | 28 | A | B | AA |
| | 29 | A | B | AA |
| | 30 | A | B | AA |
| | 31 | A | A | AA |
| | 32 | A | A | AA |
| | 33 | A | A | A |
| | 34 | A | A | A |
| | 35 | A | A | A |
| | 36 | A | A | AA |
| | 37 | A | B | AA |
| | 38 | A | B | B |

TABLE 3-2

Evaluation results

| | | Color developability | | Ozone resistance |
|---|---|---|---|---|
| | | Glossy paper | Art paper | |
| Comparative Example | 1 | A | C | B |
| | 2 | C | C | C |
| | 3 | C | B | B |
| | 4 | C | B | B |
| | 5 | C | B | B |
| | 6 | C | B | B |
| | 7 | B | A | C |
| | 8 | B | A | C |
| | 9 | B | A | C |
| | 10 | B | C | A |
| | 11 | B | C | A |
| | 12 | C | C | C |
| | 13 | C | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-046122, filed Mar. 2, 2012, which is hereby incorporated by reference herein in its entirety.

The invention claimed is:

1. An ink comprising water, a water-soluble organic solvent and an organic pigment, wherein
a primary particle of the organic pigment has a ratio (minor axis b)/(major axis a) of 0.70 or more and a particle diameter of 35 nm or less,
the ink contains the water-soluble organic solvent with a dielectric constant of 25.0 or less in an amount of 0.5% by mass or more based on the total mass of the ink, and
a dielectric constant $\in_{mix}$ of the ink as calculated according to the following equation (1) is 66 or more and 72 or less:

$$\in_{mix} = \Sigma_n \in_n r_n / \Sigma_n r_n, \quad \text{Equation (1):}$$

wherein n means a kind of water or the water-soluble organic solvent, $\in_n$ is a dielectric constant of water or the water-soluble organic solvent represented by n, and $r_n$ is a content of water or the water-soluble organic solvent represented by n based on the total mass of the ink.

2. The ink according to claim 1, wherein the organic pigment comprises at least one selected from the group consisting of a phthalocyanine pigment, a quinacridone pigment and an azo pigment.

3. The ink according to claim 1, wherein the organic pigment comprises a phthalocyanine pigment.

4. The ink according to claim 1, wherein a 1,2-alkanediol is contained in the water-soluble organic solvent with a dielectric constant of 25.0 or less, and
the content (% by mass) of the 1,2-alkanediol is 0.2% by mass or more and 10.0% by mass or less based on the total mass of the ink.

5. The ink according to claim 1, which is an ink jet ink.

6. The ink according to claim 1, wherein a content (% by mass) of the pigment in the ink is 0.1% by mass or more and 10.0% by mass or less based on the total mass of the ink.

7. The ink according to claim 1, wherein the pigment is obtained by feeding a liquid with a raw material dissolved therein to a flow path formed by arranging two treating surfaces that relatively rotate facing each other at an interval of 1 mm or less, and depositing a pigment particle as a fine particle in the flow path.

8. The ink according to claim 1, further comprising a polyoxyethylene alkyl ether as a surfactant.

9. The ink according to claim 8, wherein the content (% by mass) of the surfactant is 0.05% by mass or more and 2.0% by mass or less based on the total mass of the ink.

10. The ink according to claim 1, wherein the organic pigment comprises a self-dispersible pigment.

11. The ink according to claim 10, wherein the self-dispersible pigment has a hydrophilic group which is bonded to a particle surface thereof directly or through another atomic group.

12. The ink according to claim 11, wherein the hydrophilic group is at least one of —OH, —COOM, —SO$_3$M, —PO$_3$HM and —PO$_3$M$_2$, wherein M is a hydrogen atom, alkali metal, ammonium, or organic ammonium.

13. The ink according to claim 11, wherein the other atomic group is one of a linear or branched alkylene groups having 1 to 12 carbon atoms, an arylene group, an amide group, a sulfonyl group, an amino group, a carbonyl group, an ester group and an ether group, or the other atomic group is made of at least two of the aforementioned groups.

14. An ink cartridge comprising an ink and an ink storage portion storing the ink, wherein the ink comprises the ink according to claim 1.

15. An ink jet recording method comprising ejecting an ink from a recording head of an ink jet system to record an image on a recording medium, wherein the ink comprises the ink according to claim 1.

* * * * *